(12) United States Patent
Van Zutven

(10) Patent No.: US 7,871,017 B2
(45) Date of Patent: Jan. 18, 2011

(54) AWNING COMPRISING AN INTEGRATED SPRAYING INSTALLATION

(75) Inventor: Petrus Egbertus Wilhelmus Van Zutven, Uden (NL)

(73) Assignee: Alcre (Best) B.V. (NL)

( * ) Notice: Subject to any disclaimer, the term of this patent is extended or adjusted under 35 U.S.C. 154(b) by 408 days.

(21) Appl. No.: 11/987,446

(22) Filed: Nov. 30, 2007

(65) Prior Publication Data
US 2008/0128095 A1 Jun. 5, 2008

(30) Foreign Application Priority Data
Nov. 30, 2006 (NL) .................................. 1032970

(51) Int. Cl.
*B05B 15/00* (2006.01)
*B05B 17/00* (2006.01)
(52) U.S. Cl. ..................... 239/289; 239/208; 239/209; 160/22; 160/23.1
(58) Field of Classification Search .............. 239/208, 239/209, 289; 169/48; 166/22; 160/22, 160/23.1
See application file for complete search history.

(56) References Cited

U.S. PATENT DOCUMENTS

| 1,092,243 | A | * | 4/1914 | Cole ............................ 160/44 |
| 3,877,525 | A | * | 4/1975 | Husson et al. ................ 169/48 |
| 4,077,474 | A | * | 3/1978 | Hattori ........................ 169/48 |
| 5,934,349 | A | | 8/1999 | Faller |
| 6,494,246 | B1 | | 12/2002 | Blevins |
| 2004/0188542 | A1 | * | 9/2004 | Seann ......................... 239/289 |
| 2005/0077391 | A1 | * | 4/2005 | Powell et al. ............... 239/373 |

FOREIGN PATENT DOCUMENTS

| DE | 299 13 873 U1 | 11/1999 |
| DE | 299 17 751 U1 | 2/2001 |
| DE | 20 2004 016 294 U1 | 12/2004 |

* cited by examiner

Primary Examiner—Dinh Q Nguyen
(74) Attorney, Agent, or Firm—Maier & Maier, PLLC

(57) ABSTRACT

Awning of the type that is to be mounted on or in a facade or a wall of a building or on a vehicle, comprising a frame and sunshade means in the form of a screen which, in mounted condition, is movable with respect to the facade or wall. With the frame a spraying installation is integrated for dispersing a spray from the frame. The spraying installation comprises at least one nozzle mounted in the frame for dispersing the spray mainly under the screen. Furthermore, impeller means may be provided for effecting an improved dispersion of the spray.

10 Claims, 7 Drawing Sheets

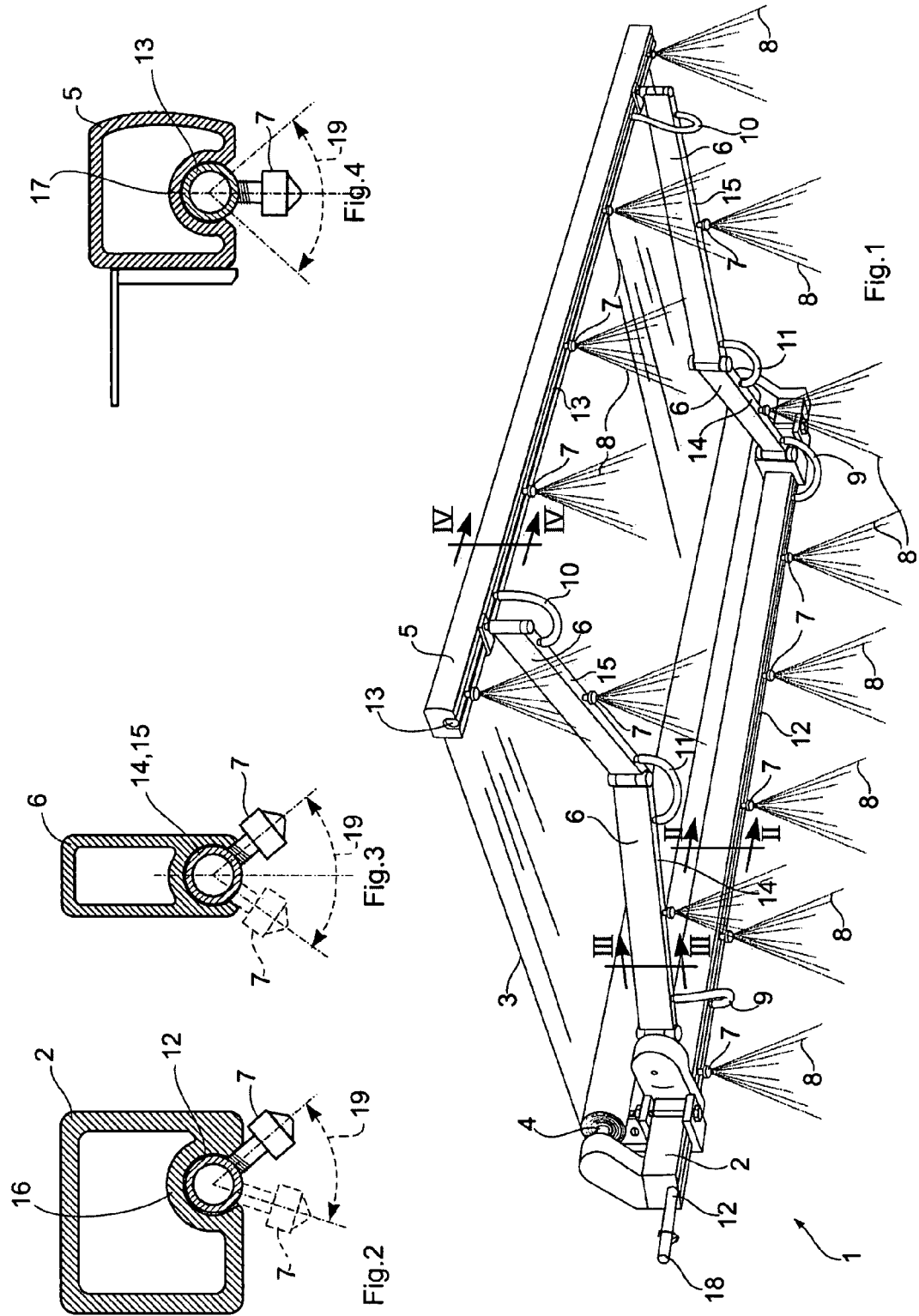

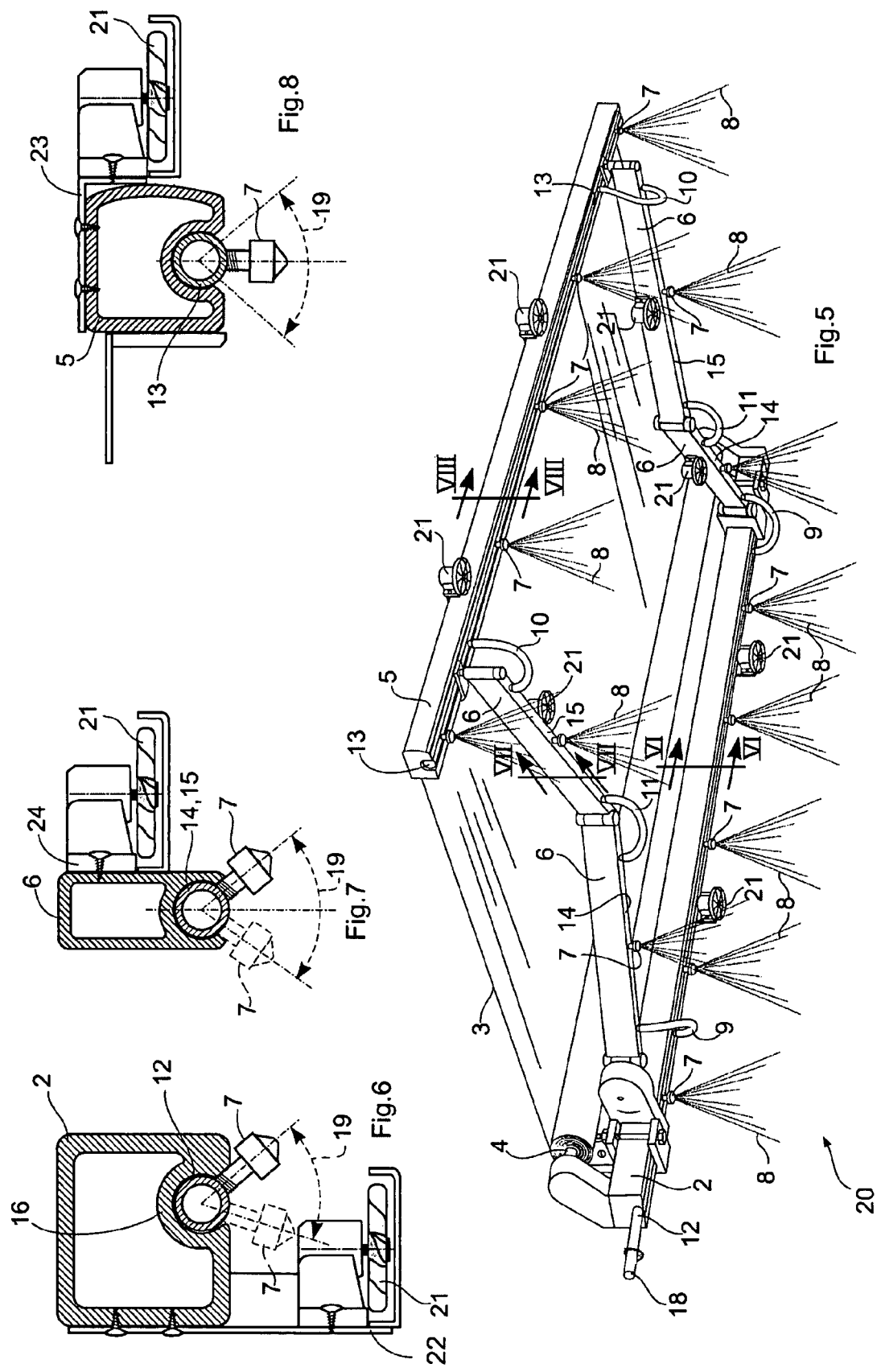

AWNING COMPRISING AN INTEGRATED SPRAYING INSTALLATION

CROSS REFERENCE TO RELATED APPLICATIONS

This application claims priority, under 35 U.S.C. §119, to Netherlands Patent Application No. 1032970, filed Nov. 30, 2006, the disclosure of which is incorporated by reference herein in its entirety.

FIELD OF THE INVENTION

The invention relates generally to awnings and, more specifically, to an awning of the type that is to be mounted on or in a facade or a wall of a building or on a vehicle, comprising a frame and sunshade means in the form of a screen which, in mounted condition, is movable with respect to the facade or wall, and spraying means.

BACKGROUND OF THE INVENTION

Exterior awnings to be mounted on or in a facade or a wall of a building or on a vehicle are generally known per se in the art. Such awnings can essentially be subdivided into the so-called dome awnings, whose sunshade means take the shape of a domed covering in use, awnings of the extension arm or retractable type, which comprise a canvas or a screen which extends in a substantially flat orientation with respect to the facade or wall on which the awning is mounted, and foldable or slidable awnings. Not only the distance over which the canvas or the screen extends from the wall, but also the angle at which the canvas or the screen is oriented with respect to the wall can be varied in some types of awnings.

Awnings are generally mounted above a window, a sliding patio door or the like in a facade or a wall of a building or on a vehicle so as to keep out direct sunlight as much as possible. In particular in the case of retractable awnings that stretch out relatively far and dome awnings, the temperature of the air under the sunshade means can reach unpleasant levels, because heated air remains trapped under the awning, in particular when there is hardly any wind or no wind at all. As a result, staying under such an awning may not be very pleasant, for example on days with a lot of sunshine.

This is disadvantageous in particular in the case of catering establishments, which have created an outdoor cafe with seating under the awning, where people can consume food products or beverages in the shade. The same drawback applies also to patios of private houses or other places screened by such an awning.

In addition to a temperature increase of the air, dust particles, pollen and other particles suspended in the air may accumulate under the awning, not least insects and the like. For people who suffer from hay fever, for example, staying under an awning may be far from pleasant in such a situation.

German utility model application DE 299 13 873 discloses an awning of the type mentioned in the preamble, wherein beneath the canvas or screen dispensers are mounted, inter alia comprising liquid for moisturing the air in the space under the canvas or screen. The dispensers in the form of containers of limited volume, are visible from the space beneath the screen or canvas and need to be separately mounted to the frame of the awning.

SUMMARY OF THE INVENTION

It is a first object of the invention to improve the prior art awning such that staying under the awning is made pleasant, also on days with a lot of sunshine and high temperatures, and improving the use and mounting of such an awning.

In order to accomplish that object, the invention provides an awning wherein the spraying means comprise a spraying installation integrated with the frame, for dispersing a spray from the frame.

Although spraying or misting installations for cooling purposes are known per se in practice, the invention is based on the perception that integrating such a spraying or misting installation in the frame of an awning yields significant advantages.

In the first place, the awning according to the invention obviates the need to install separate dispensers, modules, containers or pipes provided with nozzles on the frame and/or the facade or the wall for dispersing the spray. In this way a significant reduction of the total installation costs for the awning and the spraying installation according to the invention is directly realised, because both the awning and the spraying installation can be installed at the same time in one operation.

In the second place, the whole can be given a desired aesthetic appearance or a desired shape and be adapted to specific standardised dimensions of windows, patios, etc., if desired.

In an embodiment of the awning according to the invention, the spraying installation comprises at least one nozzle mounted in at least one part of the frame for dispersing the spray mainly under the screen of the awning. Nozzles suitable for this purpose are known per se in practice and require no further explanation.

In another embodiment of the awning according to the invention, in which the frame comprises an elongated first part to be mounted on the facade or wall, a number of nozzles are disposed in the first part of the frame, spaced along the length thereof. In this way a homogenous spray can be realised over the entire length of the sunshade means, whilst a relatively small force per nozzle for dispersing the spray suffices for obtaining the desired cooling effect, so that people will not experience any discomfort from spray being jetted out with too much force.

In another embodiment of the awning according to the invention, in which the frame comprises an elongated first part to be mounted on the facade or wall and a movable second part to which the screen is attached, which second part of the frame is connected to the first part of the frame by means of pivot arms, a number of nozzles are disposed in the second part of the frame, spaced along the length thereof.

The nozzles disposed in the second part of the frame make it possible to have the spraying take place at points spaced from the facade or wall on which or in which the awning is mounted, without having to install posts or masts for attaching pipes fitted with nozzles thereto, as is the case with a spraying installation to be installed as a separate unit.

In a preferred embodiment of the awning according to the invention, in which one or more nozzles are disposed in the pivot arms, a homogeneous spraying effect and a resulting cooling effect can be obtained over substantially the entire space under the screen.

By integrating the spraying installation not only in the part of the frame that is to be fixedly mounted but also in the movable part or in the pivot arms thereof, an effective cooling action can be effected under the screen or the canvas of the sunshade means according to the invention in an efficient manner, without having to install separate nozzles or separate pipes, whilst retaining an aesthetic appearance of the awning.

In another embodiment of the invention, one or more of the nozzles are adjustably disposed for dispersing the spray in a desired direction. In a simplified embodiment, the nozzles are manually adjustable, and in a more advanced embodiment of the awning according to the invention, the one nozzle or all nozzles are disposed in the parts of the frame or the pivot arms in such a manner as to be adjustable by remote control.

In another preferred embodiment of the awning according to the invention, the one nozzle or all nozzles are capable for making a sweeping or oscillating movement for automatically dispersing the spray while sweeping. It will be understood that in this way an even better dispersion of the spray all over the space under the screen and the space directly adjacent thereto is effected.

In yet another embodiment of the invention, impeller means are provided for fanning out a spray dispersed by the spraying installation so as to effect an optimum dispersion of the spray under the awning. These impeller means may comprise one or more fans mounted on or in the frame.

In an embodiment of the awning, in which the frame comprises a first part to be fixedly mounted and a second movable part, the fans may be provided on or in the first part as well as on and in the second part and on and in the support means via which the movable part is connected to the fixed first part of the frame.

In an embodiment of the invention, the impeller means are mounted so that they are located upstream of the nozzles, seen in the dispersion direction of the spray, and in yet another embodiment of the invention the impeller means are mounted so that they are located downstream of the nozzles, seen in the dispersion direction of the spray. The impelling direction of the impeller means, i.e. the direction in which air is fanned out by the impeller means, is preferably a direction perpendicular to the direction in which the spray is dispersed. It is also possible, however, to direct the impellers transversely or substantially transversely to the direction in which the spray is dispersed, or to combine the directions and/or to use sweeping impeller means.

In addition to providing an improved cooling effect by realising an even better dispersion of the spray in the space under the awning, as described in the foregoing, the impeller means also stir the air under the screen or canvas, thus realising a better through-flow of the air. The risk of accumulations of dust particles, pollen and other impurities in the air and insects is thus effectively reduced.

The frame of the awning is provided with a pipe extending within the frame for supplying a liquid to be sprayed to a nozzle mounted in the wall of the pipe for dispersing the liquid in the form of a spray from the interior of the pipe via the at least one nozzle. The pipe is arranged for being connected to a module for supplying the liquid to be sprayed to the nozzle under pressure.

Preferably, water is used as the liquid, so that it will be advantageous if the pipe is made of copper, stainless steel, aluminium or plastic material in order to prevent contamination of the water and leakage due to corrosion or the like.

In an embodiment of the invention, pipes in parts of the frame that are movable with respect to each other, such as the first frame part to be fixedly mounted and the second movable frame part, are connected in a fluid-tight manner by means of flexible pipes or hoses for the purpose of forming a closed circulation system into which the liquid to be sprayed is to be introduced.

It is noted that the frame parts themselves may also be fluid-tight, comprising channels formed therein and nozzles mounted in the respective frame parts, which terminate in the channels, for supplying the liquid to be sprayed to the nozzles via the channels.

To supply a liquid to be sprayed to the spraying installation of the awning according to the invention, the invention provides a module to be separately mounted and connecting means for connecting the module to the spraying installation of the awning, wherein the module comprises a pump and means for connecting the module to a liquid supply source for supplying a liquid from the liquid supply source to the spraying installation under pressure for dispersing the liquid in the form of a spray.

Such a module preferably comprises means for cooling and/or heating the liquid to be supplied to the spraying installation. This makes it possible to use the awning not only on hot days but also during colder periods for providing a certain degree of heating under the screen of the awning by heating the liquid to be sprayed.

The use of heating means is furthermore advisable in order to prevent contamination of the spraying installation of the awning with legionella, which is achieved by heating the liquid to about 50-70° C. and spraying the liquid for some time. This can be done during the night, for example, without any hazard for persons or animals present under the screen or canvas. For additional safety, the nozzles may be set to spray in the same direction in that case.

In particular in the case of commercial applications, for example at outdoor cafés and the like, it may be advantageous to add an aromatic substance and/or a colorant to the liquid of the spraying installation. Furthermore, disinfectants and/or insecticides against mosquitoes, flies and the like may be added to the liquid. Consequently, the invention further provides a module comprising means for adding such substances or agents to the liquid to be sprayed.

Although a tap for supplying the liquid to be sprayed is frequently available, the invention provides an embodiment wherein the liquid supply source of the module comprises a refillable liquid reservoir for supplying liquid to the spraying installation from this reservoir. In this way it is possible to use the awning according to the invention at practically any location, without being dependent on a water supply source.

In yet another embodiment, the module is provided with its own electrical power source, such as a battery and/or solar cells or the like for energizing inter alia the pump for spraying the liquid. In the case of an electrically operated awning it is also possible to energise the motor for operating the awning from the module. This embodiment of the invention makes it possible to realise a completely stand-alone operation of the awning according to the invention.

According to the invention, the module may be provided with adjusting means for adjusting the pressure with which the spray is dispersed by the spraying installation. The module may furthermore be arranged for supplying the liquid to the spraying installation in a pulsating manner. All this is done in order to achieve an optimum effect while minimally interfering with the way a person present under the awning according to the invention perceives his environment.

The invention further provides a spraying installation arranged for use in an awning as described in the foregoing, in particular as a unit for "upgrading" an existing awning to an awning comprising an integrated spraying installation.

The invention will be described in more detail hereinafter on the basis of preferred embodiments thereof, without being limited to such embodiments, however. In the figures, like numerals refer to identical or functionally identical parts.

BRIEF DESCRIPTION OF THE DRAWINGS

FIG. 1 is a schematic, perspective view of a preferred embodiment of an awning according to the invention of the extension arm or retractable type.

FIGS. 2, 3 and 4 are larger-scale sectional views along the lines II-II, III-III and IV-IV, respectively, in FIG. 1.

FIG. 5 is a schematic, perspective view of another preferred embodiment of an awning according to the invention of the extension arm or retractable type, which is provided with impeller means.

FIGS. 6, 7 and 8 are larger-scale sectional views along the lines VI-VI, VII-VII and VIII-VIII, respectively, in FIG. 5.

DETAILED DESCRIPTION OF THE EMBODIMENTS

Figure 9:
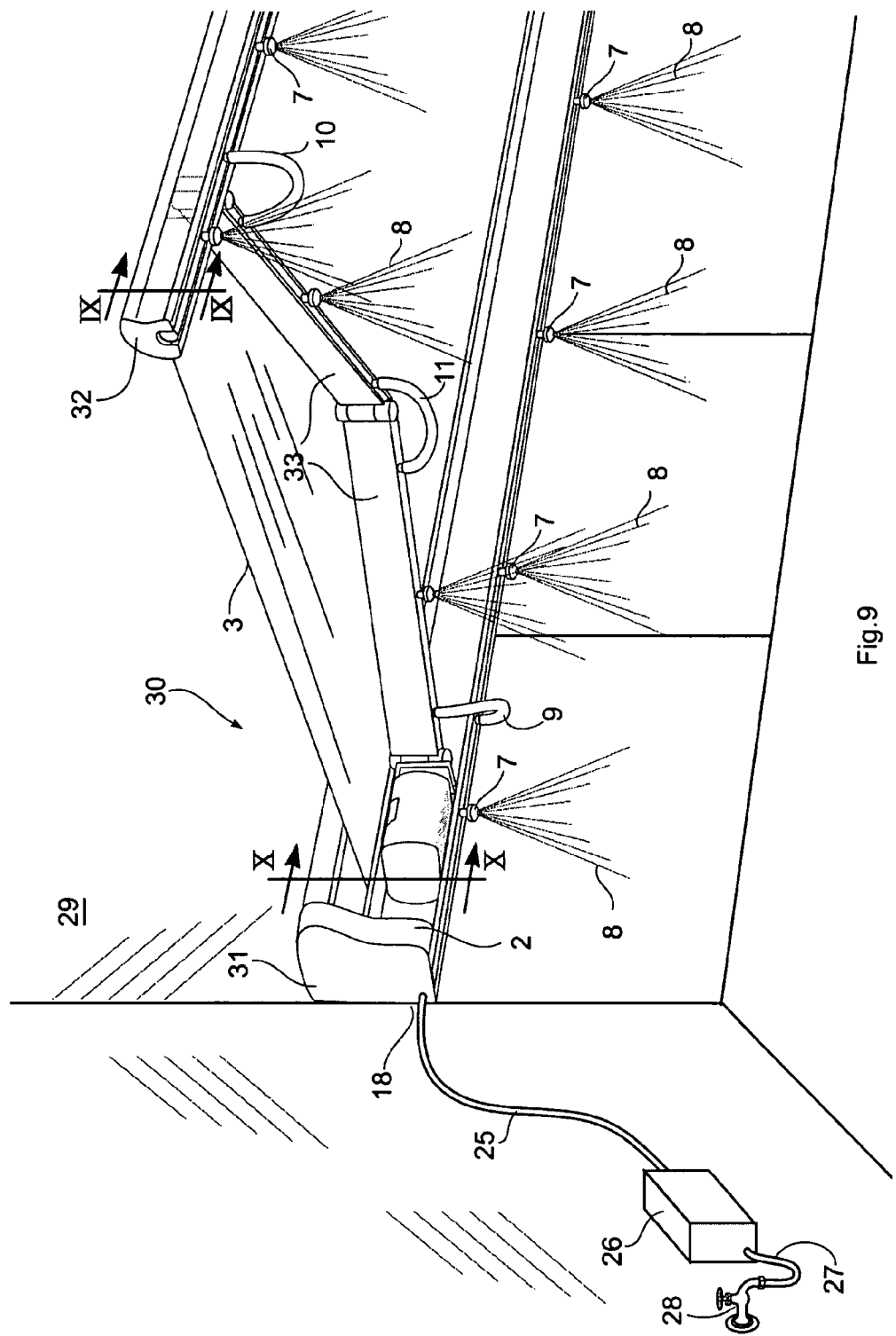
FIG. 9 is a schematic, perspective view of a part of an awning of the extension arm or retractable type according to the invention, which is connected to a module for supplying liquid to be sprayed.

The awning according to the invention that is shown in FIG. 1 is of the so-called extension arm or retractable type suitable for being mounted on or in the outer wall of a building. The awning, which is indicated as a whole at 1, comprises an elongated frame having a first frame part 2, from which sunshade means 3 in the form of an opaque screen or canvas can stretch out some distance with respect to the first frame part 2.

The sunshade means 3 in the form of a screen or canvas is wound on a so-called roller tube 4, which is connected to the first frame part 2. Attached to the outwardly projecting end of the sunshade means 3 is a movable second frame part 5 in the form of a so-called end beam or end tube. The second frame part 5 is supported by pivot arms 6 connected to the first frame part 2.

In the illustrated embodiment, the pivot arms 6 are shown to extend below the sunshade means 3, seen in the plane of the drawing. It is also conceivable, however, to mount the pivot arms 6 above the sunshade means 3, seen in the plane of the drawing.

The awning 1 may be manually or electrically operated, in which latter case an electric driving motor (not shown) may be accommodated in the roller tube 4, by means of which the sunshade means 3 in the form of the canvas or a screen can be wound on the roller tube 4 or be unwound therefrom. Depending on the construction, also the angle at which the sunshade means 3 are oriented with respect to a facade or a wall of a building can be varied.

According to a preferred embodiment of the invention, nozzles 7 are mounted in the first frame part 2, the second frame part 5 and the pivot arms 6, from which nozzles a moisture spray or mist 8 can be dispersed under the sunshade means 3.

Although this preferred embodiment is shown to comprise several nozzles 7 spaced along the length of the first frame part 2, the second frame part 5 and the pivot arms 6, it will be understood that only one nozzle or a few nozzles may suffice, for example only in the first frame part 2, only in the second frame part 5 or only in the pivot arms 6.

In the situation in which the pivot arms 6 are located above the sunshade means 3, seen in the plane of the drawing, the spray delivered by the pivot arms 6 functions to moisturise and thus cool the sunshade means 3. It will be understood that according to the invention the nozzles 7 in, for example, the second frame part 5 may also be mounted so that they moisturise the sunshade means 3 on the upper side, seen in the plane of the drawing, for cooling the sunshade means 3.

FIG. 1 furthermore clearly shows that the pivot arms 6 are connected to the first frame part 2 and the second frame part 5 by means of flexible pipes or hoses 9 and 10, respectively, whilst a flexible pipe or hose 11 is also provided between the halves of the pivot arms 6.

The flexible hoses 9, 10, 11 are connected in a fluid-tight manner to pipes or tubes 12, 13, 14 and 15 extending in the first frame part 2, the pivot arms 6 and the second frame part 5, respectively. Mounted in the pipes or tubes 12, 13, 14, 15 are the nozzles 7 for producing the spray 8.

For a better understanding of the way in which the nozzles 7 and the pipes or tubes 12, 13, 14, 15 are mounted in the respective frame parts 2, 5 and the pivot arms 6, reference is made to the sectional drawings of FIGS. 2, 3 and 4.

FIG. 2 is a sectional view of the first frame part 2 along the line II-II in FIG. 1. According to the invention, a cavity 16 extending in the longitudinal direction of the first frame part 2 from the outer side thereof is formed in the first frame part 2, in which cavity the pipe 12 is accommodated.

Similarly, a cavity 17 extending in the longitudinal direction of the second frame part 5 from the outer side thereof is formed in the second frame part 5, in which cavity the pipe 13 extends, as is shown in FIG. 4, which is a sectional view along the line IV-IV in FIG. 1.

FIG. 3 is a sectional view along the line III-III in FIG. 2 of an arm half of the pivot arms 6. This figure, too, shows that an opening 18 which is accessible from the outer side is formed in the longitudinal direction in the arm half in question, in which opening the pipe 14, 15 is accommodated.

As FIGS. 2, 3 and 4 clearly shown, the nozzles 7 are mounted in the wall of the respective pipes or tubes 12, 13, 14 and 15, for example by means of a fluid-tight screw thread, in such a manner that a liquid can be supplied to a nozzle 7 under pressure from a pipe or tube 12, 13, 14, 15. The nozzles in question are also referred to as "spraying nozzles" or "misting nozzles".

The pipes 12, 13, 14 and 15 and the flexible hoses 9, 10 and 11 form a closed, fluid-tight circulation system which extends from an inlet 18 which, seen in the drawing, is located to the left of the first frame part 2, via a pivot arm 6, the second frame part 5 and back to the first frame part 2 again via another pivot arm 6. In this way liquid can be pumped to the various nozzles 7 under pressure from the inlet 18, which liquid can subsequently be dispersed in the form of a spray 8 by the nozzles 7 in the space under the sunshade means 3.

In a preferred embodiment of the invention, the pipes or tubes 12, 13, 14, 15 in question are mounted for rotation about their longitudinal axis in the respective cavities 16, 17, 18 of the frame parts, so that these pipes 12, 13, 14, 15 can be manually or automatically rotated via suitable electrically or mechanically operated drive means for adjusting the spraying direction of a nozzle 7. The electrical operation may be remotely controlled via suitable remote control means (not shown).

In a preferred embodiment of the invention, the drive means of one or more of the pipes 12, 13, 14 and 15 are so arranged that the nozzles 7 are continuously swept between a first and a second extreme position in use, as is schematically indicated by the arrows 19 in FIGS. 2, 3 and 4.

Nozzles for use in the awning according to the invention are known per se in the art and need not be further explained to those skilled in the art. The pipes or tubes 12, 13, 14, 15 are preferably made of copper, stainless steel, aluminium or plastic material, such that there is no danger to public health caused by the migration of material particles from a pipe into the liquid to be sprayed.

The cavities 16, 17 and 18 can be formed in the frame parts 2, 5 and the pivot arms 6, respectively, by extrusion. The pipes 12, 13, 14 and 15 can in that case be inserted into the cavities 16, 17, 18 in the longitudinal direction of the respective frame parts or arm parts in question. The cavities 16, 17, 18 are so dimensioned that the pipes or tubes 12, 13, 14, 15 inserted therein cannot be moved in a direction transversely to the pipe. In this way a simple but effective integration of the spraying installation in the awning is achieved, in which the aesthetic appearance of the awning is retained without the spraying installation being found objectionable because of the presence of separate, freely suspended nozzles or the like. The hoses 9, 10, and 11 can be kept comparatively short, so that they will not be experienced as aesthetically objectionable.

Mechanical and/or electric driving means for rotating the pipes or tubes 12, 13, 14, 15 are known per se to those skilled in the art and require no further explanation herein.

It will be understood that the normal operation of the awning 1 will by no means be limited by the integration of the spraying installation therein as proposed by the invention, and that the spraying installation, when activated, provides a cooling effect to the persons present in the space under the sunshade means 3.

FIG. 5 shows an embodiment of the awning 1 similar to the embodiment described above and shown in FIGS. 1-5. In addition to the embodiment as discussed in the foregoing, the embodiment of the awning 20 that is shown in FIG. 5 comprises impeller means 21 mounted to one or more of the first frame part 2, the second frame part 5 and the pivot arms 6.

The impeller means may be configured as comparatively small and light fans, which may be disposed either upstream or downstream of the spray 8 produced by the nozzles 7.

FIGS. 6, 7 and 8 are sectional views along the lines VI-VI, VII-VII and VIII-VIII, respectively, in FIG. 5.

In FIG. 6 the impeller means 21 are clearly shown to be mounted downstream of the nozzles 7, whilst in FIGS. 7 and 8 the impeller means are disposed upstream of the nozzles 7. Suitable means of attachment 22, 23 and 24 are provided for attaching the impeller means 21 externally to a respective frame part or a pivot arm part, as is shown in sectional view in FIGS. 6, 7 and 8. This need not be further explained to those skilled in the art.

Although not explicitly shown, it will be understood that the impeller means 21, for example in the form of built-in fans, may also be built into the first and/or the second frame part 2, 5 and/or the pivot arms 6, so that they will not project from the frame, which is generally preferred for aesthetic reasons.

In FIG. 5 the impeller means 21 are all shown to blow in the dispersion direction of the spray 8. It is also possible, however, to mount one or more of the impeller means 21 in the direction transversely to the dispersion direction of the sprays 8 (not shown), thereby effecting an efficient dispersion of the spray under the sunshade means 3.

The air swirls caused by the impeller means 21 also carry off the particles, pollen and other impurities that have accumulated under the sunshade means 3. Furthermore, insects and the like dislike air swirls, so that the impeller means 21 are also effective in keeping insects away from the space under the sunshade means 3.

The impeller means 21 may be electrically connected, in a manner which is known per se, to an electric motor drive of the roller tube 4, for example, or by a separate electrical power connection (not shown).

FIG. 9 shows an embodiment of an awning 30 according to the invention mounted on an outer wall 29 of a building, in which the inlet 18 is connected to a module 26 via a pipe 25 for supplying liquid to be sprayed to the awning under pressure.

In the illustrated embodiment, the module 26 is provided with a liquid supply line 27 for connection to a tap 28 or the like and with an electrically driven pump (not shown), which is known per se, for pumping the liquid to be sprayed from the liquid supply line to the awning 30 under pressure.

Instead of being provided with the liquid supply line 27 for connection to a tap 28, or in addition thereto, the module 26 may comprise a refillable liquid reservoir for pumping liquid from the reservoir to the awning. Preferably, water is used as the liquid to be sprayed, to which an aromatic substance and/or a colorant may be added, if desired, to obtain special fragrance and/or colour effects. It is also possible, for example to add a disinfectant or an insecticide or the like to the liquid. The module 26 is to that end provided with suitable dosaging means and supply means (not shown).

Figures 10, 11:
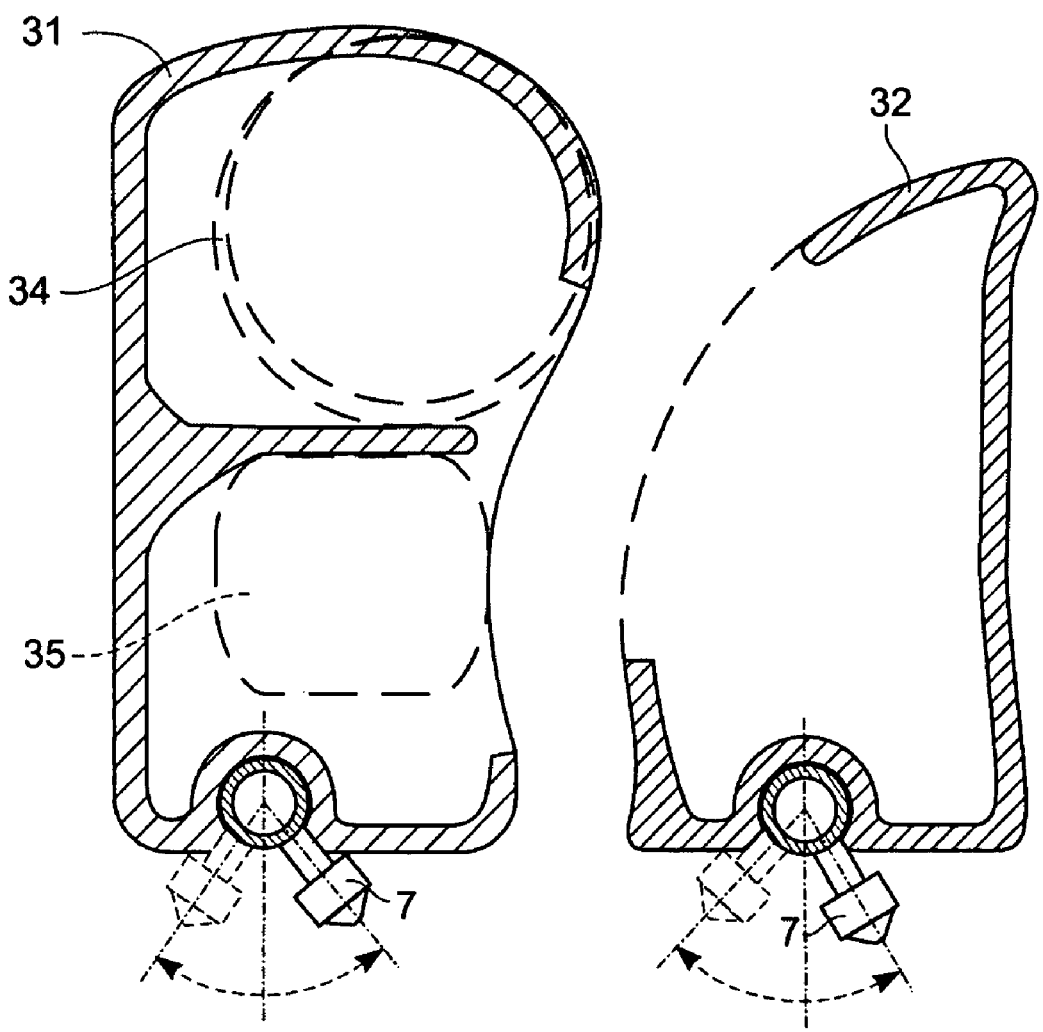
FIGS. 10 and 11 are larger-scale sectional views along the lines X-X and XI-XI, respectively, in FIG. 9.
Figure 12:
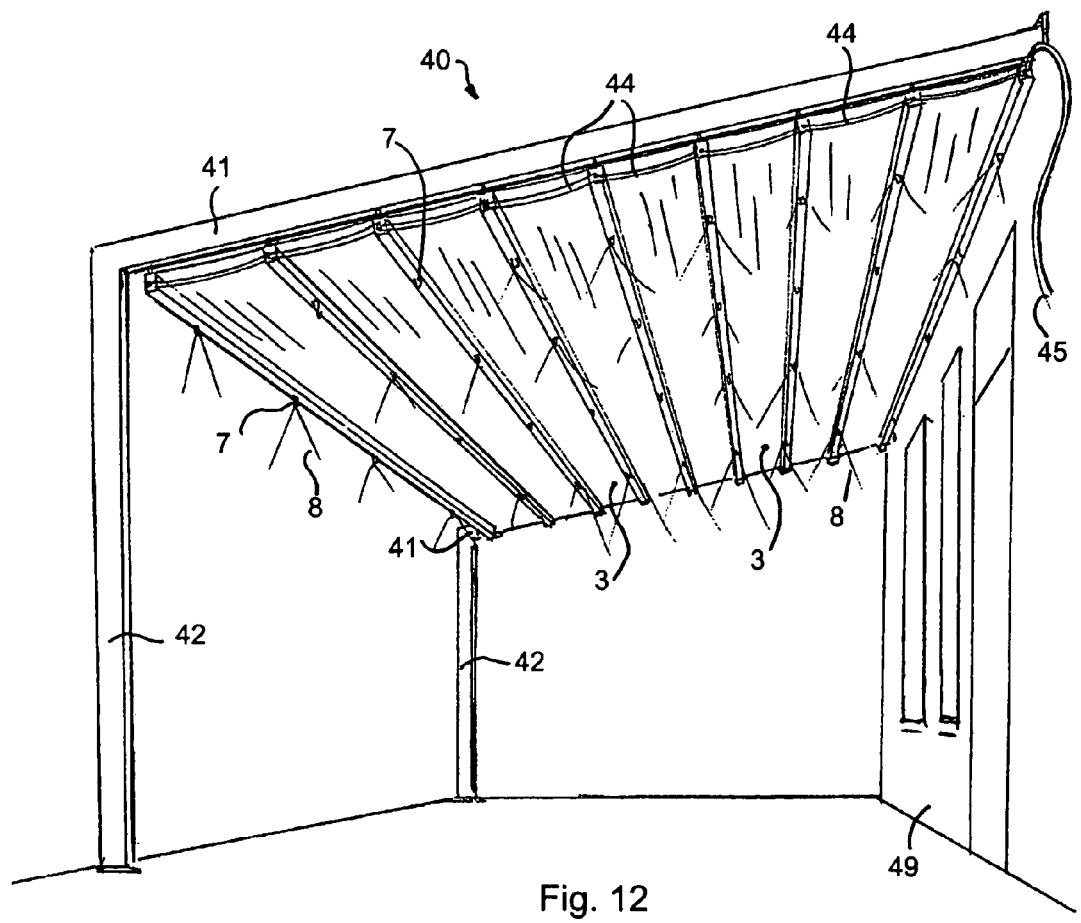
FIGS. 12, 13, 14, 15 and 16 are schematic, perspective views of a foldable or slidable awning according to the present invention.
Figure 13:
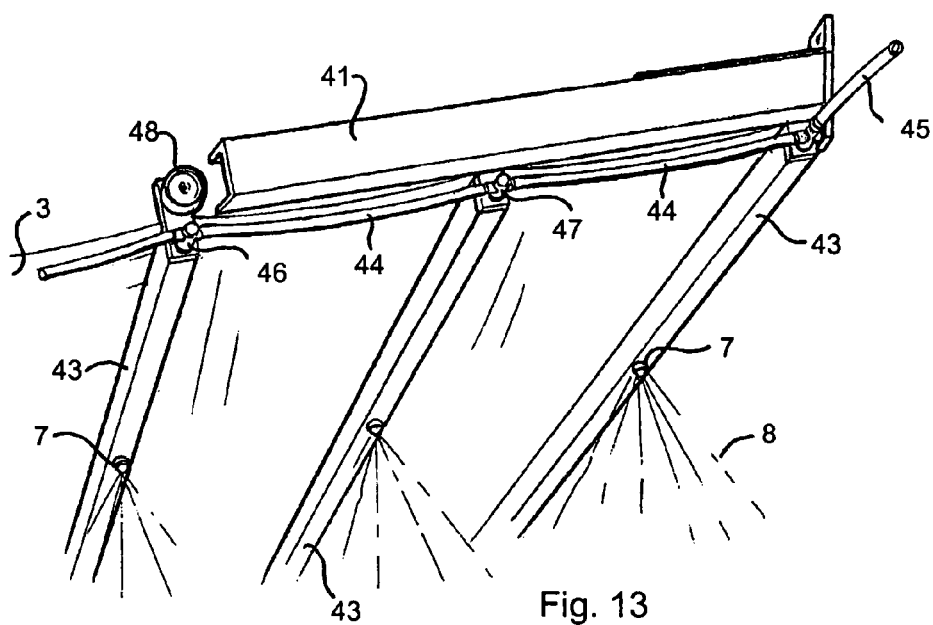
Figure 14:
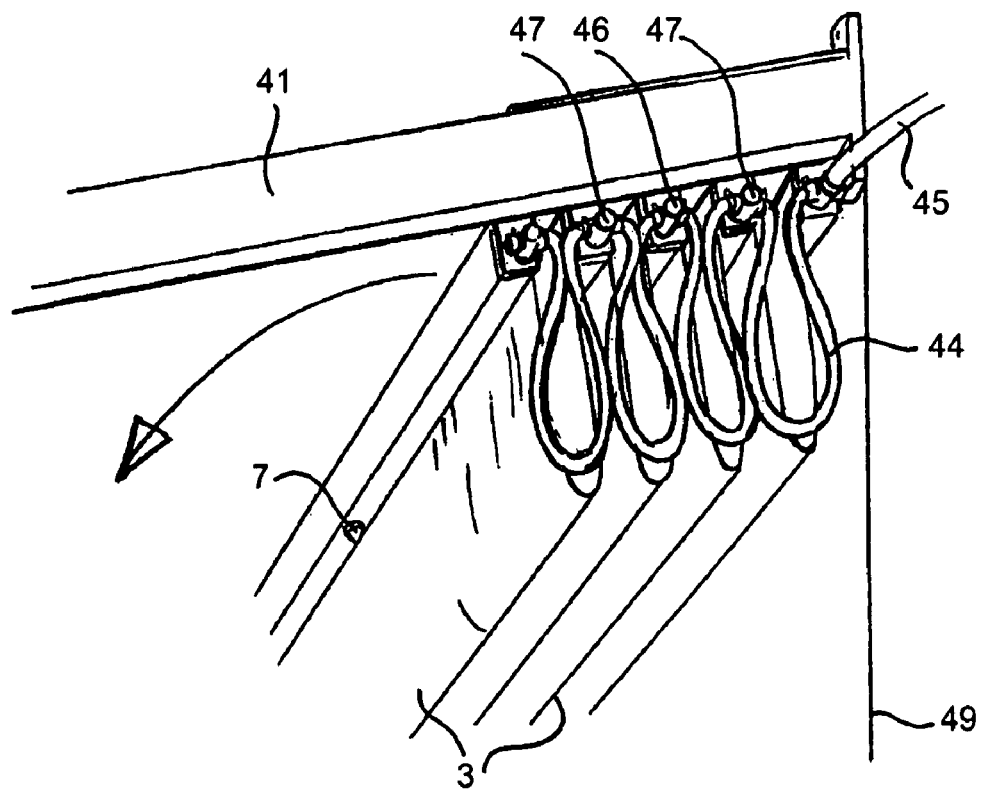
Figure 15:
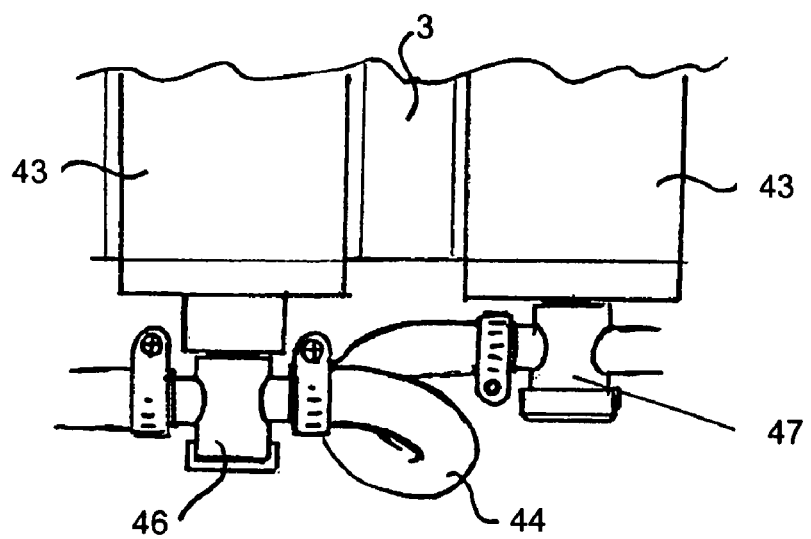
Figure 16:
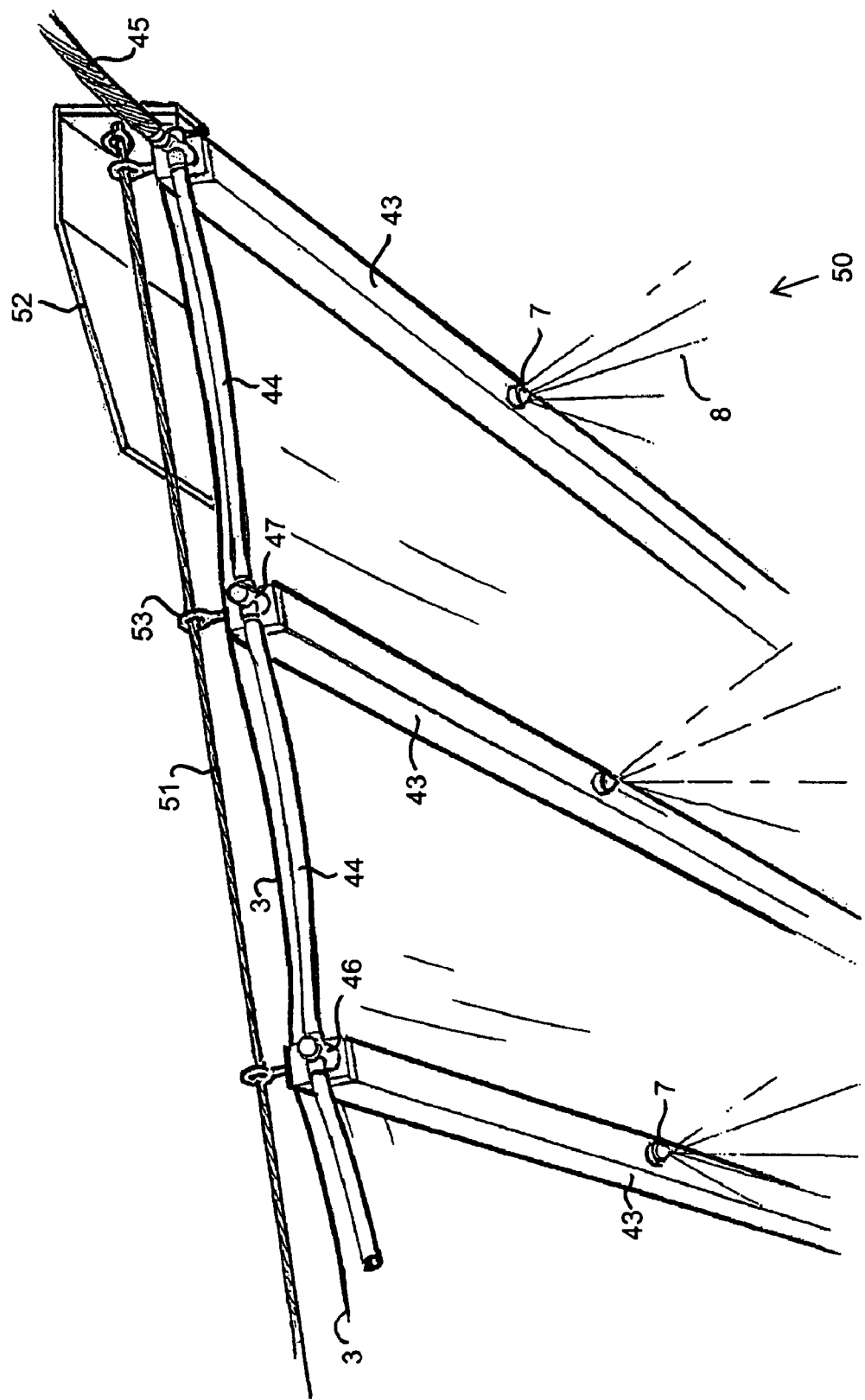

A special effect is obtained in that case if the nozzles disperse a coloured spray and the awning 1 is provided with lighting, as is illustrated in broken lines 35 in the sectional view of FIG. 10 along the line X-X in the fixed first frame part 31 in FIG. 9. FIG. 11 shows a sectional view along the line XI-XI in FIG. 9 of the movable second frame part 32 with a spraying installation according to the invention integrated therein.

By furthermore providing the module 26 with its own power source, for example in the form of a battery or one or more solar cells, which may be mounted on the module but for example also on the frame of the awning, the awning according to the invention can be installed as a completely detached unit. It is also possible to energise an electric operator for the roller tube 34 of the awning from the module 26, and also the impeller means 21, insofar as such impeller means are provided. The impeller means may be advantageously integrated in the frame parts 31 and 32 (not shown) in the embodiment of the awning 30.

It will be understood that the awning provided with an integrated spraying installation according to the invention can be installed in a simple, quick and easy manner, with the awning and the spraying installation being mounted in one operation, this in contrast to mounting the awning and the spraying installation as separate units. In the latter case an aesthetic effect cannot be obtained, especially if pipes, posts and masts must be installed for producing a spray at a point spaced from the facade or wall 29 on which the module 26 is mounted.

The module 26 may furthermore be provided with adjusting means (not shown) for adjusting the pressure with which the spray is dispersed by the spraying installation, this in order to prevent injury or an unpleasant sensation being caused by the spray flow. If necessary, the module 26 may be arranged for supplying liquid to the spraying installation in a pulsating manner, making it possible to effect a highly fascinating spectacle, for example to the rhythm of music or the like, especially when a coloured liquid is used.

The spraying installation, in the form of pipes or tubes 12, 13, 14, 15 with the nozzles 7 mounted therein and the flexible connecting hoses 9, 10, 11, and the module 26 provided with the connecting means 25 and 27 may be marketed as separate, individual units to be integrated in an existing awning. It is preferred, however, to use an awning in which the respective frame parts 2, 5, 6, 31, 32, 33 are configured or extruded in such a manner that the spraying installation, and the impeller means, if necessary, are integrated therein. The embodiment thus obtained is not only of compact construction but also aesthetically sound.

In a practical embodiment of the spraying installation, a spray or fine mist with a droplet size of about 5 micron or less can be produced by means of a pressure of about 70 bar. Such a size makes it possible to obtain an effective evaporation of the liquid to be sprayed, and thus a desired cooling effect, because the heat used for evaporating the liquid is extracted from the air under the sunshade means 3.

In a practical embodiment of the awning according to the invention, the nozzles 7 are arranged at intervals of 50-75 cm in the longitudinal direction of a frame part. In practice, awnings having a length of about 2-15 m and a maximum span width or extension of 2.5-3 m can be used, by means of which a relatively large space under the sunshade means 3 can be cooled.

To obtain an optimum cooling effect, the module 26 may be provided with a separate cooling device or cooling means (not shown). According to the invention the module 26 may also be provided with a heating device or heating means for heating the liquid to be sprayed. The heating means are in particular arranged for heating the liquid to a temperature of 50-75° C. in order to prevent legionella contamination, which can be done by operating the spraying installation with liquid of such a high temperature from time to time.

It is furthermore advisable within the framework to keep the pump in the module running when the spraying installation is turned off until no spray is being dispersed any more.

It will be understood that the awning as discussed in the foregoing is not limited to an awning of the extension arm or retractable type, but that also a dome awning or the like can be provided with an integrated spraying installation according to the invention.

FIG. 12 shows an embodiment of a foldable or slidable awning according to the present invention, which is indicated as a whole by reference numeral 40.

The awning 40 comprises a frame having vertical support posts 42 and guide rails 41 which, at one end connect to a support post 42 and at an other opposite end connect to an outer wall 49 of a building or the like.

The frame comprises further elongated crossbars or transverse members 43 which at each end are transverse to and slidably supported by a guide rail 41. Between adjacent crossbars 43 lines 3 of sunshade means extend in longitudinal direction of the crossbars 43, such as a screen, fabric or canvas.

The crossbars 43 and the lines 3 of sunshade means, in use, extend from the wall 49 of the building, such as disclosed in FIG. 12. In the retracted state, the crossbars 43 and the lines 3 of sunshade means are gathered at an end of the guide rails 41, preferably near the wall 49 of the building.

In accordance with the invention, nozzles 7 are mounted in the crossbars 43, for spraying liquid 8 in the space beneath the sunshade means 3. In order to feed liquid to the nozzles 7, the crossbars 43 may comprise a hollow compartment along their length or the nozzles 8 connect by a suitable piping or hose mounted in the crossbars 43. At an end the crossbars 43 connect by flexible hoses 44 and an inlet hose 45 for feeding liquid to the nozzles 7.

FIG. 13 shows a detail of the foldable or slidable awning 40 according to FIG. 12, showing guide rollers 48 by which the crossbars 43 may slide in longitudinal direction of a U-shaped guide rail 41. A flexible hose 44 connects by connection means 46, 47 to a crossbar 43.

FIG. 14 shows the awning 40 in its retracted state, wherein the crossbars 43 are gathered near the outer wall 49 of the building and wherein the lines 3 of sunshade means are folded, like each hose 44.

FIG. 15 shows on an enlarged scale, two adjacent crossbars 43 in the retracted position of the awning 40. From this enlarged detail of FIG. 14, it can be seen that the hose connections 46, 47 are staggeredly arranged in lengthwise direction of the crossbars 43, that is the hose connections 46 extend further from the crossbar 43 than the hose connection 47, such that the crossbars 43, in the retracted state of the awning, can be located close next to each other.

FIG. 16 shows an other embodiment of a foldable or slidable awning 50, wherein the guide rails 41 of the awning 40 of FIGS. 12-15 are replaced by a support cable 51 along which the crossbars 43 are slidably supported by eye hooks 53. A cover strip 52, which in use is mounted to the wall 49 of a building, may extend above the awning, seen in the plane of the drawing, in order to protect the retracted crossbars 43 and lines 3 of sunshade means in their retracted position, from rain, snow and dust.

Although not explicitly shown in FIGS. 12-16, impeller means 21 may be provided with the crossbars 43 for further dispersion of spray or mist 8 of the nozzles 7.

It will be understood that the invention is not limited to the embodiments as shown and described herein, but that several modifications and additions can be made by a person skilled in the art without departing from the inventive concept. All these modifications and embodiments are considered to be incorporated in the appended claims.

The invention claimed is:

1. An awning of a type that is to be mounted on a wall comprising a frame and sunshade means formed as a screen which, in mounted condition, is movable with respect to said wall and spraying means, wherein:

said spraying means comprise a spraying installation integrated with said frame, for dispersing a spray from said frame; and said frame comprises an elongated first part to be mounted on said wall and a movable second art to which said screen is attached which second art of said frame is connected to said first part of said frame by means of pivot arms, and wherein a plurality of nozzles is disposed in said second part of said frame, spaced along a length of said second part.

2. An awning according to claim 1, wherein said spraying installation comprises at least one nozzle disposed in at least one part of said frame for dispersing said spray mainly under said screen.

3. An awning according to claim 1, wherein said frame comprises an elongated first part to be mounted on said wall, and wherein a plurality of nozzles is disposed in said first part of said frame, spaced along a length of said first part.

4. An awning according to claim 1, wherein said spraying installation comprises at least one nozzle adjustably disposed in at least one part of said frame for dispersing said spray in a desired direction.

5. An awning according to claim 1, wherein said spraying installation comprises at least one nozzle adjustably disposed in at least one part of said frame, wherein said at least one nozzle is manually adjustable.

6. An awning according to claim 1, wherein said spraying installation comprises at least one nozzle adjustably disposed in at least one part of said frame, wherein said at least one nozzle is adjustable by remote control.

7. An awning according to claim 1, wherein said spraying installation comprises at least one nozzle adjustably disposed in at least one part of said frame, wherein said at least one nozzle is arranged for a sweeping movement for dispersing said spray while sweeping.

8. An awning according to claim 1, wherein said spraying installation comprises at least one nozzle disposed in at least one part of said frame, wherein said at least one nozzle is mounted in a wall of a pipe extending within said part of said frame for dispersing a spray from said pipe via said at least one nozzle, wherein said pipe is arranged for connecting to a module for supplying liquid to be sprayed to said nozzle.

9. An awning of a type that is to be mounted on a wall comprising a frame and sunshade means formed as a screen which, in mounted condition, is movable with respect to said wall and spraying means, wherein:

said spraying means comprise a spraying installation integrated with said frame, for dispersing a spray from said frame; and wherein said frame comprises an elongated first part to be mounted on said wall and a movable second part to which said screen is attached, which second part of said frame is connected to said first part of said frame by means of pivot arms, and wherein a plurality of nozzles is disposed in said pivot arms.

10. An awning of a type that is to be mounted on a wall comprising a frame and sunshade means formed as a screen which, in mounted condition, is movable with respect to said wall and spraying means, wherein:

said sprang means comprise a sprang installation integrated with said frame, for dispersing a spray from said frame; and said frame comprises a plurality of elongated slidably parallel mounted crossbars connected by foldable lines of sunshade means, wherein a plurality of nozzles is disposed in a plurality of said crossbars, spaced along a length of a crossbar.

* * * * *